United States Patent
Yadav et al.

(10) Patent No.: US 12,174,786 B2
(45) Date of Patent: Dec. 24, 2024

(54) METHOD AND SYSTEM FOR PREFETCHING BACKUP DATA FOR APPLICATION RECOVERIES

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 18/157,437

(22) Filed: Jan. 20, 2023

(65) Prior Publication Data

US 2024/0248874 A1     Jul. 25, 2024

(51) Int. Cl.
 *G06F 11/00* (2006.01)
 *G06F 11/14* (2006.01)
 *G06F 16/11* (2019.01)

(52) U.S. Cl.
 CPC ........ *G06F 16/122* (2019.01); *G06F 11/1456* (2013.01); *G06F 11/1469* (2013.01); *G06F 2201/84* (2013.01); *G06F 2201/885* (2013.01)

(58) Field of Classification Search
 CPC ............ G06F 11/1456; G06F 11/1469; G06F 2201/84
 USPC ...................................... 714/1–57
 See application file for complete search history.

(56) References Cited

U.S. PATENT DOCUMENTS

| | | | |
|---|---|---|---|
| 6,408,336 B1 | 6/2002 | Schneider et al. | |
| 6,965,976 B2 | 11/2005 | Yamaguchi | |
| 7,640,406 B1 * | 12/2009 | Hagerstrom | G06F 16/1744 711/159 |
| 8,132,047 B2 * | 3/2012 | Bauer | G06F 11/1433 714/15 |
| 8,554,918 B1 | 10/2013 | Douglis | |
| 8,812,455 B1 | 8/2014 | Claudatos | |
| 8,983,899 B1 | 3/2015 | Ghait | |

(Continued)

FOREIGN PATENT DOCUMENTS

| | | |
|---|---|---|
| WO | 2001006367 A1 | 1/2001 |
| WO | 2014195957 A1 | 12/2014 |

OTHER PUBLICATIONS

Jaebum Sim et al., "Secure firmware architecture using virtual hard disks", 2014 10th International Conference on Information Assurance and Security (IAS), Nov. 2014, pp. 66-70.

*Primary Examiner* — Sarai E Butler
(74) *Attorney, Agent, or Firm* — Chamberlain, Hrdlicka, White, Williams & Aughtry; Aly Dossa

(57) ABSTRACT

Techniques described herein relate to a method for performing data protection of file system data on a host. The method includes identifying, by a data protection agent, a backup access event associated with a backup of a file system stored on a backup storage; in response to identifying the backup access event: obtaining backup metadata associated with the backup from a data protection manager; generating a placeholder file system using the backup metadata and storing the placeholder file system in virtual hard disk file; loading the virtual hard disk file on a target application; performing, after the loading, prefetching of backup data using the virtual hard disk file and the backup metadata to store the backup data in a cache; and performing backup access services using the virtual hard disk file, the backup metadata, and the cache.

18 Claims, 9 Drawing Sheets

(56) References Cited

U.S. PATENT DOCUMENTS

| | | |
|---|---|---|
| 9,239,840 B1 | 1/2016 | Acharya |
| 9,268,784 B1 | 2/2016 | Guo et al. |
| 9,292,226 B2 | 3/2016 | Moyer |
| 9,298,707 B1 | 3/2016 | Zhang et al. |
| 9,430,332 B1 | 8/2016 | Bahadure |
| 9,772,791 B2 | 9/2017 | Resch |
| 9,811,425 B1 | 11/2017 | Kleinschnitz |
| 9,977,704 B1 | 5/2018 | Chopra et al. |
| 10,102,083 B1 | 10/2018 | Dobrean et al. |
| 10,210,052 B1 | 2/2019 | Kumar |
| 10,320,757 B1 | 6/2019 | Secker-walker |
| 10,346,252 B1 | 7/2019 | Gould |
| 10,417,213 B1 | 9/2019 | Mukku et al. |
| 10,445,191 B1 | 10/2019 | Baruch |
| 10,489,066 B1 | 11/2019 | Krinke |
| 10,572,350 B1 | 2/2020 | Bansal et al. |
| 10,642,698 B1 | 5/2020 | Chopra et al. |
| 10,719,486 B1* | 7/2020 | Buchman ............ G06F 16/21 |
| 11,265,148 B1 | 3/2022 | Griffin et al. |
| 11,297,459 B2 | 4/2022 | Raduchel et al. |
| 11,556,428 B2 | 1/2023 | Tanaka |
| 2003/0115447 A1 | 6/2003 | Pham et al. |
| 2008/0086609 A1 | 4/2008 | Lesser et al. |
| 2010/0058114 A1 | 3/2010 | Perkins et al. |
| 2010/0250497 A1 | 9/2010 | Redlich et al. |
| 2011/0113012 A1 | 5/2011 | Gruhl et al. |
| 2011/0131185 A1 | 6/2011 | Kirshenbaum |
| 2011/0158106 A1* | 6/2011 | Williamson ........ G06F 16/283 370/242 |
| 2011/0185190 A1 | 7/2011 | Berengoltz |
| 2011/0213928 A1 | 9/2011 | Grube et al. |
| 2012/0117445 A1* | 5/2012 | Lu ................ G06F 11/1666 714/763 |
| 2012/0150816 A1 | 6/2012 | Pafumi et al. |
| 2013/0091536 A1 | 4/2013 | Manjunath |
| 2013/0159381 A1 | 6/2013 | Morgan |
| 2014/0115029 A1 | 4/2014 | Baldwin et al. |
| 2014/0115098 A1 | 4/2014 | Reich |
| 2014/0136832 A1 | 5/2014 | Klum et al. |
| 2014/0310800 A1 | 10/2014 | Kabra et al. |
| 2014/0324776 A1* | 10/2014 | Novak ............... G06F 16/178 707/827 |
| 2014/0351632 A1 | 11/2014 | Grube et al. |
| 2015/0046192 A1 | 2/2015 | Raduchel |
| 2015/0066865 A1 | 3/2015 | Yara |
| 2015/0066866 A1 | 3/2015 | Yara |
| 2015/0169898 A1 | 6/2015 | Embcke |
| 2015/0242648 A1 | 8/2015 | Lemmey |
| 2016/0019317 A1* | 1/2016 | Pawar ............... G06F 16/128 707/649 |
| 2016/0034133 A1 | 2/2016 | Wilson et al. |
| 2016/0132521 A1 | 5/2016 | Reininger |
| 2016/0154710 A1* | 6/2016 | Wade ............... G06F 11/1438 714/19 |
| 2016/0179416 A1 | 6/2016 | Mutha et al. |
| 2016/0274978 A1 | 9/2016 | Strohmenger et al. |
| 2016/0357971 A1 | 12/2016 | Sinha et al. |
| 2016/0371500 A1 | 12/2016 | Huang et al. |
| 2017/0124345 A1 | 5/2017 | Christiansen |
| 2017/0371547 A1 | 12/2017 | Fruchtman et al. |
| 2018/0032446 A1 | 2/2018 | Amarendran et al. |
| 2018/0039652 A1 | 2/2018 | Nichols |
| 2018/0067848 A1 | 3/2018 | Baldwin |
| 2018/0089044 A1 | 3/2018 | Guim Bernat et al. |
| 2018/0095855 A1 | 4/2018 | Sanakkayala |
| 2018/0101312 A1* | 4/2018 | Koszewnik .......... G06F 3/0619 |
| 2018/0129821 A1 | 5/2018 | Havewala |
| 2018/0157860 A1 | 6/2018 | Nair et al. |
| 2018/0159729 A1 | 6/2018 | Deshmukh et al. |
| 2018/0225177 A1 | 8/2018 | Bhagi et al. |
| 2018/0232528 A1 | 8/2018 | Williamson et al. |
| 2018/0329905 A1 | 11/2018 | Christiansen |
| 2019/0057101 A1 | 2/2019 | Esserlieu et al. |
| 2019/0158596 A1 | 5/2019 | Mcshane et al. |
| 2019/0205056 A1 | 7/2019 | Halstuch |
| 2019/0205195 A1* | 7/2019 | Tee .................. G06F 16/285 |
| 2019/0312910 A1 | 10/2019 | Convertino et al. |
| 2019/0332683 A1 | 10/2019 | Thummala et al. |
| 2019/0354708 A1 | 11/2019 | Fisher et al. |
| 2020/0012431 A1 | 1/2020 | Chopra et al. |
| 2020/0125650 A1 | 4/2020 | Ignatowicz et al. |
| 2020/0233975 A1 | 7/2020 | Rosenthol et al. |
| 2020/0241908 A1 | 7/2020 | Dornemann et al. |
| 2020/0241975 A1 | 7/2020 | Basham et al. |
| 2020/0285771 A1 | 9/2020 | Dey et al. |
| 2020/0301882 A1 | 9/2020 | Pogde et al. |
| 2020/0302082 A1 | 9/2020 | Carteri et al. |
| 2020/0320208 A1 | 10/2020 | Bhosale et al. |
| 2020/0341827 A1 | 10/2020 | Morard |
| 2020/0394107 A1 | 12/2020 | Ramohalli Gopala Rao |
| 2021/0034571 A1 | 2/2021 | Bedadala et al. |
| 2021/0035089 A1 | 2/2021 | Johnston |
| 2021/0117277 A1 | 4/2021 | Shetty et al. |
| 2021/0133040 A1 | 5/2021 | Bansal et al. |
| 2021/0133248 A1 | 5/2021 | Sharma et al. |
| 2021/0209068 A1 | 7/2021 | Appireddygari Venkataramana |
| 2021/0216413 A1* | 7/2021 | Saad ................ G06F 11/1464 |
| 2022/0043712 A1* | 2/2022 | Rana ................ G06F 3/0644 |
| 2023/0205548 A1 | 6/2023 | Cook |
| 2023/0385153 A1 | 11/2023 | George |
| 2024/0028753 A1 | 1/2024 | Yadav |
| 2024/0126654 A1 | 4/2024 | Engle |

* cited by examiner

METHOD AND SYSTEM FOR PREFETCHING BACKUP DATA FOR APPLICATION RECOVERIES

BACKGROUND

Computing devices may provide services for users. To provide the services, the computing devices may generate data. The computing devices may provide to and obtain data from other computing devices. The data may be important to the user. Data protection services may be performed to protect the data. Data protection services may include performing recoveries of unavailable data.

SUMMARY

In general, certain embodiments described herein relate to a method for performing data protection of file system data on a host. The method may include identifying, by a data protection agent, a backup access event associated with a backup of a file system stored on a backup storage; in response to identifying the backup access event: obtaining backup metadata associated with the backup from a data protection manager; generating a placeholder file system using the backup metadata and storing the placeholder file system in virtual hard disk file; loading the virtual hard disk file on a target application; performing, after the loading, prefetching of backup data using the virtual hard disk file and the backup metadata to store the backup data in a cache; and performing backup access services using the virtual hard disk file, the backup metadata, and the cache.

In general, certain embodiments described herein relate to a system for performing data protection of file system data on a host. The system includes a backup storage for storing backups and host. The host also includes a data protection agent programmed to identify a backup access event associated with a backup of a file system stored on a backup storage; in response to identifying the backup access event: obtain backup metadata associated with the backup from a data protection manager; generate a placeholder file system using the backup metadata and storing the placeholder file system in virtual hard disk file; load the virtual hard disk file on a target application; perform, after the loading, prefetching of backup data using the virtual hard disk file and the backup metadata to store the backup data in a cache; and perform backup access services using the virtual hard disk file, the backup metadata, and the cache.

In general, certain embodiments described herein relate to a non-transitory computer readable medium that includes computer readable program code, which when executed by a computer processor enables the computer processor to perform a method for performing data protection of file system data on a host. The method may include identifying, by a data protection agent, a backup access event associated with a backup of a file system stored on a backup storage; in response to identifying the backup access event: obtaining backup metadata associated with the backup from a data protection manager; generating a placeholder file system using the backup metadata and storing the placeholder file system in virtual hard disk file; loading the virtual hard disk file on a target application; performing, after the loading, prefetching of backup data using the virtual hard disk file and the backup metadata to store the backup data in a cache; and performing backup access services using the virtual hard disk file, the backup metadata, and the cache.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
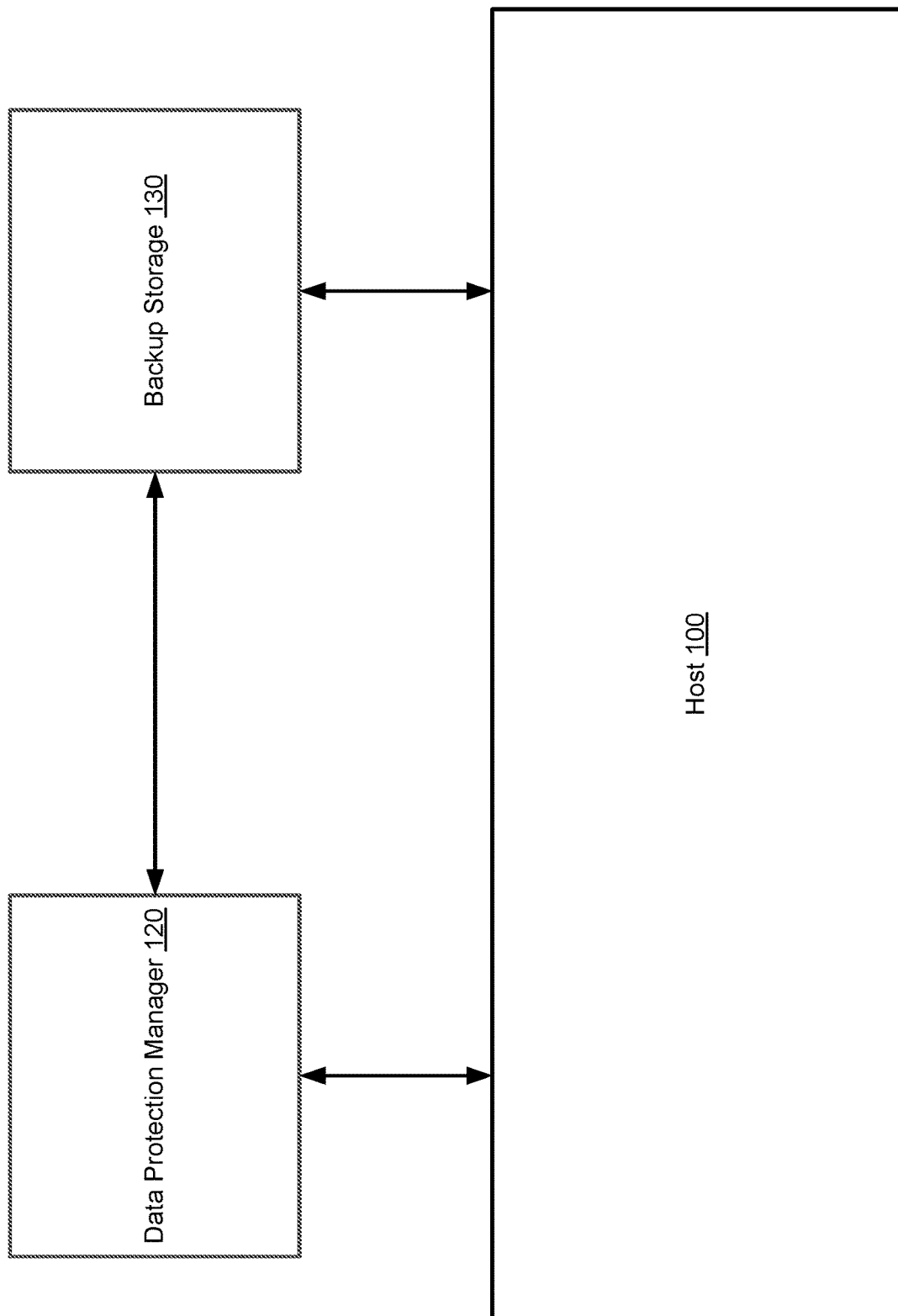
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as a and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for prefetching backup data during application recoveries or application backup access.

Backup storages may generally be designed for optimized writes to enable faster backups and replications. These backups and the backup storages are not application aware nor are they intended for efficient restorations. Applications may generally perform random reads of data from the backup storages. Backup storages may often become bottlenecked due to high volumes of activity for applications storing and/or accessing data on the backup storages. Some applications may have time sensitive IOs, meaning that they may require data read from the backup target within a certain amount of time before the reach command times out. Due to random reads and bottlenecking, backup storages may not be able to satisfy some application read commands in a timely manner.

To address, at least in part, the issues discussed above, embodiments disclosed herein enable data prefetching from the backup storage. Because the backup storage may not know anything about the applications, application data or file system data containing applications may be written to the backup storage in a streaming format as a single file. Applications that read this data randomly may put performance pressure on both the application itself and the backup storage.

In one or more embodiments disclosed herein, VHDX format may be used to address, at least in part, the aforementioned issues discussed above. VHDX files may be mounted natively by all operating systems, and once mounted any application can read/write data from these mounted backup files. Embodiments disclosed herein may not impose any restriction on the original backup format. Backups may be in any format. Application data may typically be written into their native formats. One or more embodiments disclosed herein enable a backup to be natively available without any kernel driver or virtual file system using VHDX. Additionally, embodiments disclosed herein enable item level restorations on a host, not requiring the copy of the entire backup data to the host. The backup data may reside on the backup storage, but it may be fetched based on the need of the corresponding application or the application user.

FIG. 1A shows a diagram a system in accordance with one or more embodiments disclosed herein. The system may include a host (100), a data protection manager (120), and a backup storage (130). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the host (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the host (100) described herein and/or all, or a portion, of the methods illustrated in FIGS. 2A-4. The host (100) may be implemented using other types of computing devices without departing from the embodiments disclosed herein. For additional details regarding computing devices, refer to FIG. 5.

The host (100) may be implemented using logical devices without departing from the embodiments disclosed herein. For example, the host (100) may include virtual machines that utilize computing resources of any number of physical computing devices to provide the functionality of the host (100). The host (100) may be implemented using other types of logical devices without departing from the embodiments disclosed herein.

In one or more embodiments, the host (100) may include the functionality to, or otherwise be programmed or configured to, perform computer implemented services for users of the host (100). The cloud services may include electronic mail communication services, database services, calendar services, inferencing services, and/or word processing services. The computer implemented services may include other and/or additional types of services without departing from embodiments disclosed herein. The host (100) may also include the functionality to perform local data protection services. The local data protection services may include generating backups, generating backup metadata, providing backups to the backup storage (130), providing backup metadata to the data protection manager (120), and performing backup access services. The local data protection services may include other and/or additional services without departing from embodiments disclosed herein. The host (100) may include the functionality to perform all, or a portion of, the methods discussed in FIGS. 2A-5. The host (100) may include other and/or additional functionalities without departing from embodiments disclosed herein. For additional information regarding the host, refer to FIG. 1B.

In one or more embodiments, the data protection manager (120) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-4. The data protection manager (120) may be implemented using other types of computing devices without departing from embodiments disclosed herein. For additional details regarding computing devices, refer to FIG. 5.

In one or more embodiments, the data protection manager (120) may be implemented using logical devices without departing from embodiments disclosed herein. For example, the data protection manager (120) may include virtual machines that utilize computing resources of any number of physical computing devices to provide the functionality of the data protection manager (120). The data protection manager (120) may be implemented using other types of logical devices without departing from the embodiments disclosed herein.

In one or more embodiments, the data protection manager (120) may include the functionality to, or may be otherwise programmed or configured to, perform data protection management services for the data generated on the host (100). The data protection management services may include: (i) initiating the performance of data protection services by a data protection agent (discussed below) executing on the host based on user requests and/or protection policies, (ii) maintaining backup metadata associated with backups, and (iii) generating and providing a user interface based on the backup metadata that provides users with an item level view of backups.

The data protection management services may include other and/or additional services without departing from embodiments disclosed herein. The data protection manager (120) may include the functionality to perform all, or a portion of, the methods of FIGS. 2A-4. The data protection manager (120) may include other and/or additional functionalities without departing from embodiments disclosed herein. For additional information regarding the data protection manager (120), refer to FIG. 1C.

In one or more embodiments, the backup storage (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (130) described herein and/or all, or a portion, of the methods illustrated in FIGS. 2A-4. The backup storage (130) may be implemented using other types of computing devices without departing from the embodiments disclosed herein. For additional details regarding computing devices, refer to FIG. 5.

The backup storage (130) may be implemented using logical devices without departing from the embodiments disclosed herein. For example, the backup storage (130) may include virtual machines that utilize computing resources of any number of physical computing devices to provide the functionality of the backup storage (130). The backup storage (130) may be implemented using other types of logical devices without departing from the embodiments disclosed herein.

In one or more embodiments, the backup storage (130) may include the functionality to, or otherwise be programmed or configured to, obtain and store backups data generated on the host (100). The backup storage (130) may also include the functionality to provide all, or a portion, of the backup stored on the backup storage (130) to the host (100) for item level recovery or item level access purposes. The backup storage (130) may include the functionality to perform all, or a portion of, the methods discussed in FIGS. 2A-4. The backup storage (130) may include other and/or additional functionalities without departing from embodiments disclosed herein.

Although the system of FIG. 1A is shown as having a certain number of components (e.g., 100, 120, 130), in other embodiments disclosed herein, the system may have more or fewer components. For example, the functionality of each component described above may be split across components or combined into a single component. Further still, each component may be utilized multiple times to carry out an iterative operation.

Figure 1B:
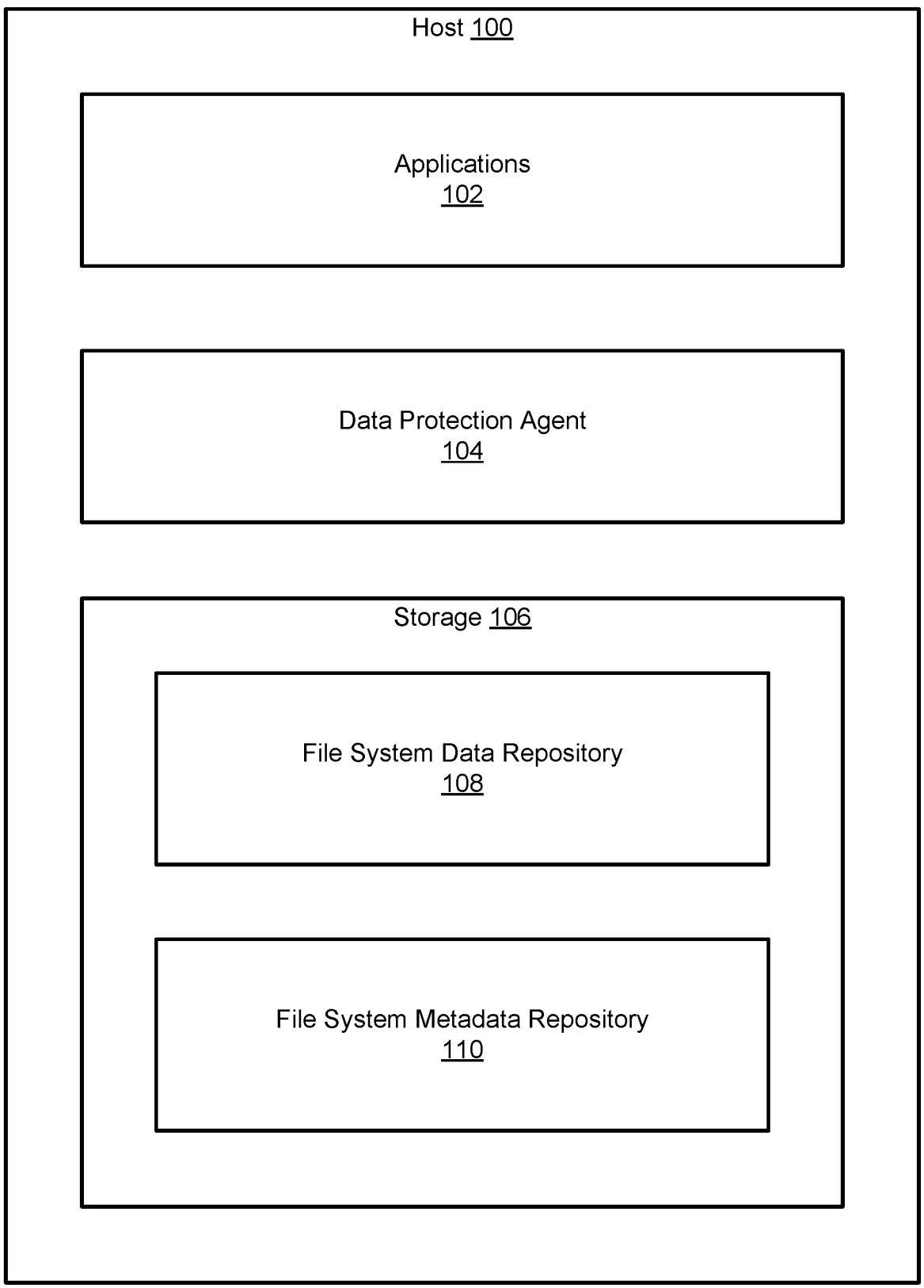
FIG. 1B shows a diagram of a host in accordance with one or more embodiments disclosed herein.

FIG. 1B shows a diagram of a host in accordance with one or more embodiments disclosed herein. The host (100) may be an embodiment of the host (100, FIG. 1A) discussed above. As discussed above, the host (100) may include the functionality to perform computer implemented services and local data protection services. To perform the aforementioned services, the host (100) may include applications (102), a data protection agent (104), and storage (106). The host (100) may include other, additional, and/or fewer components without departing from embodiments disclosed herein. For example, the host may include multiple data protection agents if multiple applications require distinct backup generation functionalities. Each of the aforementioned components of the host (100) is discussed below.

In one or more embodiments disclosed herein, the applications (102) are implemented as sets of computer instructions, e.g., computer code, stored on a storage (e.g., 106) that when executed by a processor of the host (100) causes the host (100) to provide the functionality of the applications (102) described throughout this Detailed Description. Each application may be executed to provide one or more computer implemented service performed by the host (100). For example, a database application may perform database services, a word processing application may perform word processing services, and an electronic mail communication application may perform electronic mail communication services of the host (100).

In one or more embodiments disclosed herein, the data protection agent (104) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection agent (104) described throughout this Detailed Description.

In one or more embodiments disclosed herein, the data protection agent (104) is implemented as computer instructions, e.g., computer code, stored on a storage (e.g., 106) that when executed by a processor of the host (100) causes the host (100) to provide the functionality of the data protection agent (104) described throughout this Detailed Description.

In one or more embodiments disclosed herein, the data protection agent (104) is implemented using one or more external computing devices. Although such an implementation is not shown in the systems of FIG. 1A or FIG. 1B, the one or more computing devices may be operatively connected to the host (100) enabling the data protection manager to remotely interact with the host (100). For additional information regarding computing devices, refer to the discussion above with respect to FIG. 1A or the discussion below with respect to FIG. 5.

In one or more embodiments, the data protection agent (104) may include the functionality to perform the aforementioned local data protection services of the host (100). To perform the local data protection services, the data protection agent (104) may obtain requests and information from the data protection manager (120, FIG. 1A), and send and respond to commands between the backup storage (130, FIG. 1A) and the applications (102). The sending and responding to the commands may result in the performance of all, or a portion, of the methods discussed in FIGS. 2A-4. The commands may be associated with an Internet Protocol, such as for example, Internet Small Computer Systems Interface (iSCSI). For additional information regarding the functionality of the data protection agent (104), refer to FIGS. 2A-4.

In one or more embodiments, the storage (106) may be implemented using one or more volatile or non-volatile storages or any combination thereof. The storage (106) may include the functionality to, or otherwise be configured to, store and provide all, or portions, of information that may be used by the applications (102) and/or the data protection agent (104). The information stored in the storage (106) may include a file system data repository (108) and a file system metadata repository (110). The storage may include other and/or additional information without departing from embodiments disclosed herein. Each of the aforementioned types of information is discussed below.

In one or more embodiments disclosed herein, the applications (102) and/or users of the applications (102) generate data during the performance of computer implemented services. The data may be stored in a file system. In one or more embodiments disclosed herein, a file system is an organizational data structure that tracks how application data is stored and retrieved in a system (e.g., in storage (106) of the host (100), i.e., the file system data repository (108)). The file system may specify references to assets of applications and any asset data associated with each asset. An asset may be an individual data object in the file system. An asset may be, for example, a folder associated with an application(s) (e.g., 102). Each asset may include any number of elements. The elements may be, for example, subfolders and/or files associated with the application(s) (e.g., 102). Each file may include file data. The file data may include, for example, database data, calendar data, electronic mail communications data, etc.

In one or more embodiments, the file system data repository (108) may include one or more data structures that may be used to generate backups. The file system data repository (108) may include file data generated by the applications (102) and/or users of the applications (102) as discussed above. The file data may be any type of data such as database data and email data generated by users of the applications (102) without departing from the invention. Each application of the applications (102) may be associated with any number of assets (e.g., files, folders, etc.), each asset may include any quantity of file data, and furthermore, each asset may include any number of elements without departing from embodiments disclosed herein. Users and/or applications (102) may use the file data of the file system data repository (108) when obtaining computer implemented services from the production host (110, FIG. 1A). Additionally, the file data of the file system data repository (108) may be obtained by the data protection agent (112) to generate backups. The file data of the file system data repository (108) may be used by other and/or additional entities for other and/or additional purposes without departing from embodiments disclosed herein. Additionally, the file system data repository (108) may include other and/or additional types of information without departing from embodiments disclosed herein.

In one or more embodiments, the file system metadata repository (110) may include one or more data structures that include information regarding files included in the file system stored in the file system data repository (108). The information may include, for example, for each file: file identifiers associated with the file, the file length or size, the creation date, the modification date, the application identifier associated with the file, and a parent file or folder associated with the file. The file system metadata repository (110) may include other and/or additional information associated with the files stored in the file system data repository (108) without departing from embodiments disclosed herein. The file system metadata repository (110) may be used by the users of the applications (102) and/or the applications (102) during the performance of computer implemented services. The file system metadata repository (110) may be used by the data protection agent (104) to generate backup metadata (discussed below). The information included in the file system metadata repository (110) may be generated by the applications (102) and/or users of the applications (102) during the performance of computer implemented services and stored in the file system metadata repository (110).

While the data structures (e.g., 108, 110) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (106), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 1C:
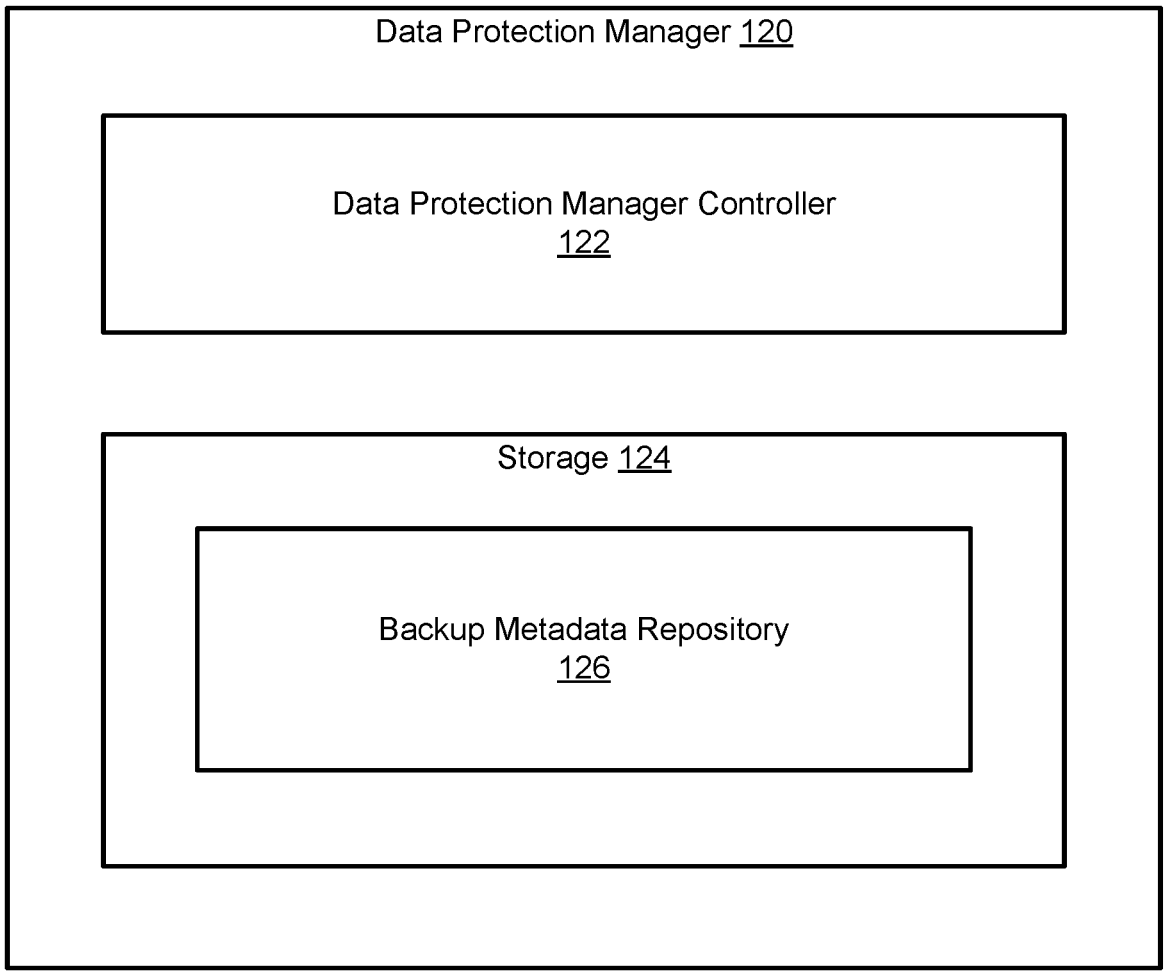
FIG. 1C shows a diagram of a data protection manager in accordance with one or more embodiments disclosed herein.

FIG. 1C shows a diagram of a data protection manager in accordance with one or more embodiments disclosed herein. The data protection manager (120) may be an embodiment of the data protection manager (120, FIG. 1A) discussed above. As discussed above, the data protection manager (120) may include the functionality to perform data protection management services. To perform the aforementioned services, the data protection manager (120) may include a data protection manager controller (122) and storage (124). The data protection manager (120) may include other, additional, and/or fewer components without departing from embodiments disclosed herein. Each of the aforementioned components of the data protection manager (120) is discussed below.

In one or more embodiments disclosed herein, the data protection manager controller (122) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection manager controller (122) described throughout this Detailed Description.

In one or more embodiments disclosed herein, the data protection manager controller (122) is implemented as computer instructions, e.g., computer code, stored on a storage (e.g., 124) that when executed by a processor of the data protection manager (120) causes the data protection manager (120) to provide the functionality of the data protection manager controller (122) described throughout this Detailed Description.

In one or more embodiments, the data protection manager controller (122) may include the functionality to perform the aforementioned data protection management services. To perform the data protection management services, the data protection manager controller (122) may send requests and information to the data protection agent (104, FIG. 1B) to initiate the generation of backups and backup access services. The data protection manager controller (122) may perform all, or a portion, of the methods discussed in FIGS. 2A-4. For additional information regarding the functionality of the data protection manager controller (122), refer to FIGS. 2A-4.

In one or more embodiments, the storage (124) may be implemented using one or more volatile or non-volatile storages or any combination thereof. The storage (124) may include the functionality to, or otherwise be configured to, store and provide all, or portions, of information that may be used by users of the system and the data protection agent (104) to perform backup access services. The information stored in the storage (124) may include a backup metadata repository (126). The storage (124) may include other and/or additional information without departing from embodiments disclosed herein.

In one or more embodiments, the backup metadata repository (126) may include one or more data structures that include information regarding backups of the data generated on the host (100, FIG. 1A). The information may include, for example, for each backup, a backup identifier, a backup generation timestamp, and a storage location included in the backup storage. The information may also include, for each file in a backup: a file identifier associated with the file, a file name associated with the file, the file length or size, the application identifier associated with the file, a parent file or folder associated with the file, and an offset (discussed below) associated with the file. The information may further include application information associated with the backups such as an application identifier, an application name, and an application type (e.g., database application, a word processing application, etc.). In one or more embodiments disclosed herein, the backup metadata repository (126) may also include modification metadata. The modification metadata may include file identifiers, modification types (e.g., modified, added, deleted, etc.), corresponding backup identifiers, storage locations, and updated file sizes associated with files that have been modified during backup access services.

The backup metadata repository (126) may include other and/or additional information associated with backups of the data generated on the host (100, FIG. 1A) without departing from embodiments disclosed herein. The backup metadata repository (126) may be used by the data protection agent (104, FIG. 1B) during the performance of backup access services. The information included in the backup metadata repository (126) may be generated by the data protection agent (104, FIG. 1B) during the backup generation and backup access services and stored in the backup metadata repository (126).

While the data structures (e.g., 126) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (124), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 2A:
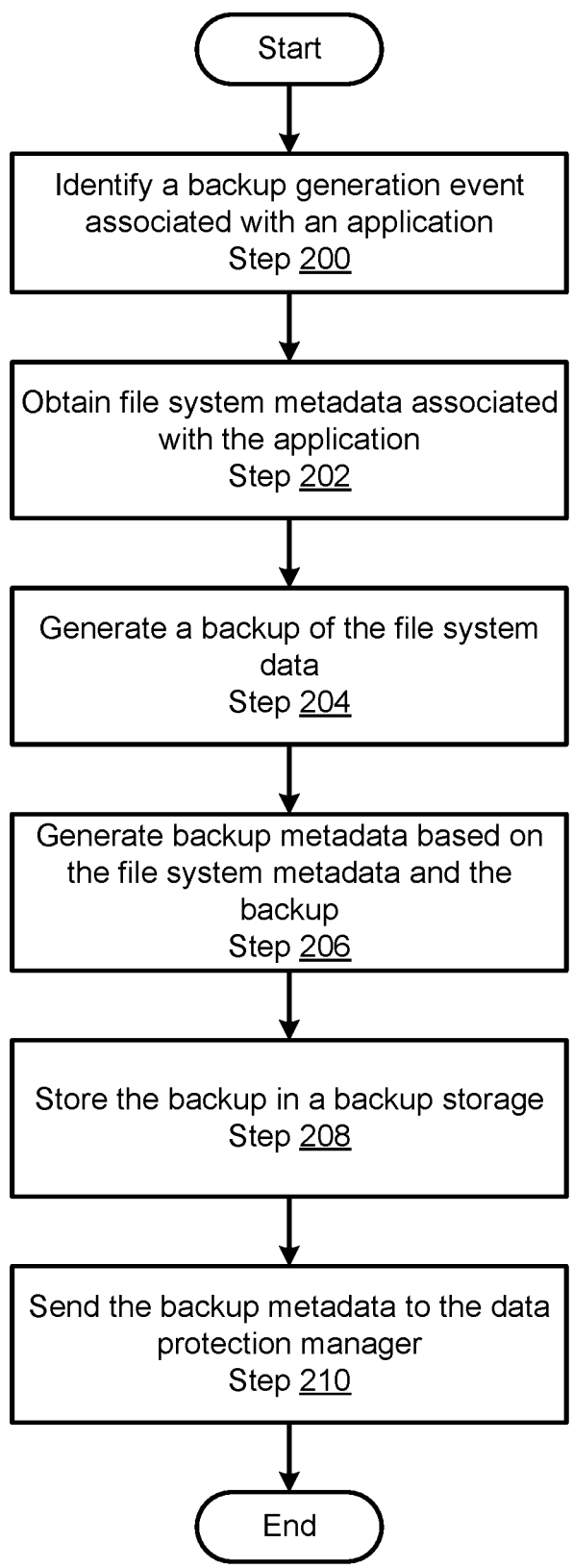
FIG. 2A shows a flowchart of a method for generating a backup in accordance with one or more embodiments disclosed herein.

FIG. 2A shows a flowchart of a method for generating a backup in accordance with one or more embodiments disclosed herein. The method shown in FIG. 2A may be performed by, for example, a data protection agent (e.g., 104, FIG. 1B). Other components of the system in FIGS. 1A-1C may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a backup generation event associated with an application is identified. In one or more embodiments, the data protection agent may obtain a request to generate a backup from the data protection manager. The data protection agent may identify the receipt of the request as the backup generation event. The request may include an application specific backup generation request (i.e., a backup of files of the host file system associated with a particular application). The request may include the application identifier associated with the application targeted by the request. In another embodiment, the request may include a file system backup generation request (i.e., a request to generate a backup of the entire file system of the host). The request may include other and/or additional information associated with backup generation without departing from embodiments disclosed herein.

In one or more embodiments, the data protection manager may send the request based on a protection policy associated with an application or the file system. The protection policy may be a data structure that specifies backup requirements (e.g., a backup schedule specifying points in time to generate backups). The protection policies may be generated by users and provided to the data protection manager, which may monitor the protection policies to initiate the performance of data protection services according to the backup requirements specified by the protection policy. In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein.

The backup generation event associated with an application may be identified via other and/or additional methods without departing from embodiments disclosed herein.

In Step 202, file system metadata associated with the application is obtained. As discussed above, the storage of the host may include file system metadata repository that stores information associated with files included in the file system of the host generated by user and/or applications of the host during the performance of computer implemented services. The data protection agent may obtain file system metadata associated with the application (for an application specific backup) or for the entirety of the file system (for a file system backup) from the file system metadata repository. The data protection agent may use the application identifier to obtain file system metadata associated with the application. The data protection manager may use other appropriate methods, frameworks, or techniques to obtain file system metadata and other information regarding applications of the host (e.g., a Volume Shadow Copy Service (VSS)). The file system metadata associated with the application may be obtained via other and/or additional methods without departing from embodiments disclosed herein.

In Step 204, a backup of the file system is generated. In one or more embodiments, the data protection agent may use any appropriate technique to generate a backup of the file system (or files of the file system associated with an application) without departing from embodiments disclosed herein. For example, the data protection agent may generate, or initiate the generation of, a snapshot of the file system, where the snapshot of the file system is the backup of the file system. A backup of the file system may be generated via other and/or additional methods without departing from embodiments disclosed herein.

In Step 206, a backup metadata is generated based on the file system metadata and the backup. In one or more embodiments, the data protection agent may generate backup metadata based on the backup and the file system metadata. The data protection agent may generate a backup metadata file and include all, or a portion of the file system metadata in the backup metadata file. As a result, the backup metadata may include, for each file, a file identifier associated with the file, a file name associated with the file, the file length or size, the application identifier associated with the file, a parent file or folder associated with the file. In addition to the above information, the data protection agent may also include an offset associated with each of the files.

The offset may specify the distance from a reference point in storage that includes the start of a file in the backup. The distance may refer to the number of physical addresses or the quantity of data (e.g., bytes) between a reference point in the storage and the start of a file. The reference point may be a physical address that includes the first file of the backup or a base address in a storage. Since the backup may be stored according to the hierarchy of files included in the backup storage, the offset may be used to collect only a specifically requested file in the backup during backup access services. The offset may be derived from the backup itself or from the file system metadata (e.g., the parent file identifiers and the size or lengths of each file). The data protection agent may also include backup information in the backup metadata file which may include an assigned backup identifier associated with the backup, a creation timestamp associated with the backup, and a targeted storage location for the backup (e.g., as specified by the backup request obtained from the data protection manager). The backup metadata may be generated based on the file system metadata and the backup via other and/or additional methods without departing from embodiments disclosed herein.

In Step 208, the backup is stored in a backup storage. In one or more embodiments, the data protection agent sends the backup to the backup storage along with a request to store the backup. In response to obtaining the backup and the request, the backup storage stores the backup in the backup storage. The backup may also include a copy of the backup metadata. The backup and the request may be provided to the backup storage using any appropriate method of data transmission without departing from embodiments disclosed herein. For example, the data protection agent may transmit the backup and the request as a message that includes one or more network packets through one or more network devices that operatively connect the data protection agent to the backup storage. The backup may be stored in the backup storage via other and/or additional methods without departing from embodiments disclosed herein.

In Step 210, the backup metadata is sent to the data protection manager. In one or more embodiments, the data protection agent sends the backup metadata to the data protection manager along with a request to store the backup metadata. In response to obtaining the backup metadata and the request, the data protection manager stores the backup metadata in the backup metadata repository. The backup metadata and the request may be provided to the data protection manager using any appropriate method of data transmission without departing from embodiments disclosed herein. For example, the data protection agent may transmit the backup metadata and the request as a message that includes one or more network packets through one or more network devices that operatively connect the data protection agent to the data protection manager. The backup metadata may be sent to the data protection manager via other and/or additional methods without departing from embodiments disclosed herein.

In one or more embodiments, the method ends following Step 210.

Figure 2B:
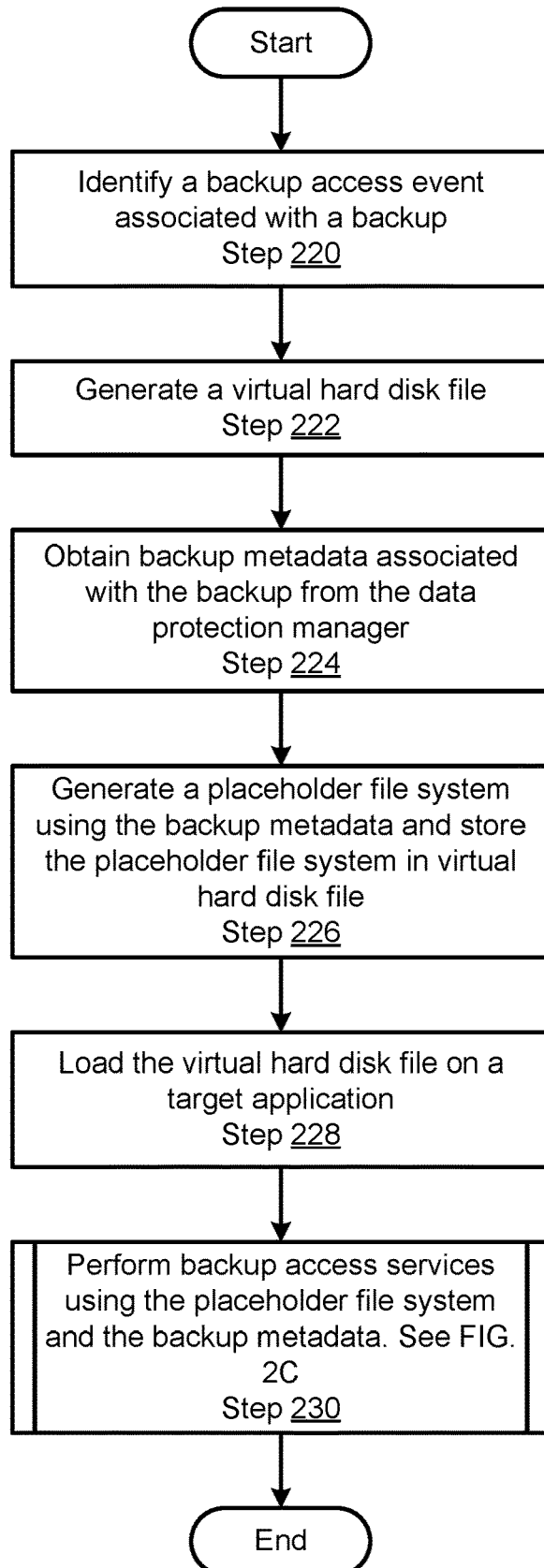
FIG. 2B shows a flowchart of a method for setting up item level access of a backup in accordance with one or more embodiments disclosed herein.

FIG. 2B shows a flowchart of a method for setting up item level access of a backup in accordance with one or more embodiments disclosed herein. The method shown in FIG. 2B may be performed by, for example, a data protection agent (e.g., 104, FIG. 1B). Other components of the system in FIGS. 1A-1C may perform all, or a portion, of the method of FIG. 2B without departing from the scope of the embodiments described herein. While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a backup access event associated with a backup is identified. In one or more embodiments, the data protection agent may obtain a request to access a backup. The request may be from an application, directly from a user of the application, or from the data protection manager in response to a through a request obtained from a user through a user interface. The data protection agent may identify the receipt of the request as the backup access event. The request may include an application specific backup access request (i.e., a request to access a backup of files of the host file system associated with a particular application). In another embodiment, the request may include a file system backup access request (i.e., a request to access a backup of the entire file system of the host). The request may include the backup identifier associated with the backup targeted by the request. The request may include other and/or additional information associated with the backup without departing from embodiments disclosed herein. The backup generation event associated with a backup may be identified via other and/or additional methods without departing from embodiments disclosed herein.

In Step 222, a virtual hard disk file is generated. In one or more embodiments, the data protection agent generates a virtual hard disk file. The virtual hard disk file may be, for example, a virtual hard disk v2 (VHDX) file consistent with VHDX format. The virtual hard disk file may not include any data and/or metadata upon generation. The data protection agent may also mount the virtual hard disk file to the host. The virtual hard disk file may be generated via other and/or additional methods without departing from embodiments disclosed herein.

In Step 224, backup metadata associated with the backup is obtained from the data protection manager. In one or more embodiments, the data protection agent sends a request for the backup metadata associated with the backup to the data protection manager. The request may include the backup identifier. In response to obtaining the request, the data protection manager obtains and sends the backup metadata to the data protection agent. The backup metadata and the request may be provided to and from the data protection agent using any appropriate method of data transmission without departing from embodiments disclosed herein. For example, the data protection agent may transmit the request as a message that includes one or more network packets through one or more network devices that operatively connect the data protection agent to the data protection manager. Additionally, the data protection manager may transmit the backup metadata as a message that includes one or more network packets through one or more network devices that operatively connect the data protection agent and the data protection manager. The backup metadata associated with the backup may be obtained from the data protection manager via other and/or additional methods without departing from embodiments disclosed herein.

In Step 226, a placeholder file system is generated using the backup metadata and stored in the virtual hard disk file. In one or more embodiments, the data protection agent may generate a placeholder file system using the backup metadata and store the placeholder file system in the virtual hard disk file. The placeholder file system may include placeholder files arranged in the hierarchy specified in the backup metadata (e.g., via the parent file identifiers). The placeholder files may include the file identifiers associated with the corresponding file as specified by the backup metadata. The placeholder files may be set to include the length of the corresponding file as specified by the backup metadata. The placeholder files may include other information (e.g., file type, creation timestamps, corresponding application identifier, etc.) associated with the corresponding files in the backup without departing from embodiments disclosed herein. The placeholder files of the placeholder file system in the virtual hard disk file may not yet include actual file data.

In one or more embodiments, the data protection agent may obtain logical block addresses (LBAs) associated with each placeholder file in the placeholder file system stored in the virtual hard disk file. An LBA may refer to a block or other portion of virtual hard disk file where a placeholder file of the placeholder file system is stored or located. The data protection agent may generate a map of the LBAs and the corresponding placeholder files. The map may be any type of mapping without departing from embodiments disclosed herein. For example, the map may be a key value map where the LBA of a file is the key and the file name is the corresponding value. The LBA map may be included in the virtual hard disk file. The backup metadata may be updated to include a copy of the LBA map. The placeholder file system may be generated using the backup metadata and stored in the virtual hard disk file via other and/or additional methods without departing from embodiments disclosed herein.

In Step 228, the virtual hard disk file is loaded on a target application. In one or more embodiments, the data protection agent unmounts the virtual hard disk file. The data protection agent may launch, instantiate, initiate launch or otherwise initiate instantiation of an ISCSI target. The ISCSI target may be a software-based ISCSI target (e.g., computing instructions executed on the host, data protection agent, or the backup storage) or a hardware-based ISCSI target (e.g., a physical device including circuitry or a computing device such as a server) configured to receive and service ISCSI commands. The ISCSI target may be operatively connected to the backup storage and the data protection agent. The ISCSI target may open, or otherwise access, the virtual hard disk file, and generate an asset hierarchy using the identified subscriptions and the corresponding account information. The data protection agent may then launch or instantiate an ISCSI initiator. The ISCSI initiator may be a software-based ISCSI initiator (e.g., computing instructions executed on the host or the data protection agent) or a hardware-based ISCSI initiator (e.g., a physical device including circuitry or a computing device such as a server) configured to generate and send ISCSI commands. The ISCSI initiator may be operatively connected to the application. The data protection agent then establishes a connection between the ISCSI initiator and the ISCSI target such that the ISCSI initiator may send ISCSI commands to the ISCSI target, which may then service the commands and return the results to the ISCSI initiator.

The ISCSI target may load the virtual hard disk file and supply logical unit number (LUN) information to the ISCSI initiator. The LUN information may enable the initiator to present the virtual hard disk file as a volume to the target application executing on the host. The virtual hard disk file may be loaded on the target application via other and/or additional methods without departing from embodiments disclosed herein.

In Step 230, backup access services are performed using the virtual hard disk file and the backup metadata. After the virtual hard disk file is presented to the target application, the target application may begin requesting to read placeholder files of the placeholder file system stored in the virtual hard disk file. The data protection agent may then perform backup access services using the placeholder file system and the backup metadata. For additional information regarding the performance of backup access services, refer to FIG. 2C.

In one or more embodiments disclosed herein, the method ends following Step 220.

Figure 2C:
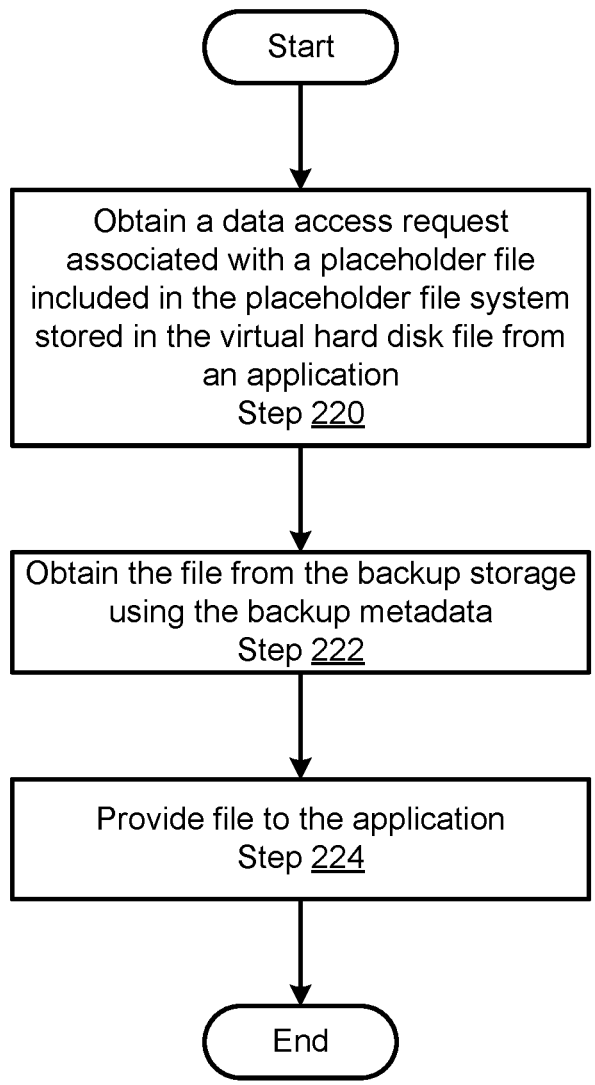
FIG. 2C shows a flowchart of a method for performing item level backup access services in accordance with one or more embodiments disclosed herein.

FIG. 2C shows a flowchart of a method for performing backup access services in accordance with one or more embodiments disclosed herein. The method shown in FIG. 2C may be performed by, for example, a data protection agent (e.g., 104, FIG. 1B). Other components of the system in FIGS. 1A-1C may perform all, or a portion, of the method of FIG. 2C without departing from the scope of the embodiments described herein. While FIG. 2C is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a data access request associated with a placeholder file in the placeholder file system stored in the virtual hard disk file is obtained from an application. In one or more embodiments, the application submits a read request to the data protection agent. The data protection agent may then, through the ISCSI initiator, submit a SCSI command to read a placeholder file in the place holder file system stored in the virtual hard disk file ISCSI target. The read request and the resulting SCSI command may include the LBA and the file size associated with the file. The data access request associated with the file may be the ISCSI command. A data access request associated with a file in the placeholder file system stored on the virtual hard disk file may be obtained from the application via other and/or additional methods without departing from embodiments disclosed herein.

In Step 222, the file is obtained from the backup storage using the backup metadata. In one or more embodiments, the ISCSI target may not be able to directly obtain the file data using the LBA since the LBA is associated with the virtual hard disk file and not the backup stored in the backup storage. Accordingly, the ISCSI target uses the LBA map included in the backup metadata to identify the file corresponding to the placeholder file is associated with the SCSI command. As discussed above, the LBA map may include a key value map that specifies LBAs and the corresponding file names or file identifiers. The ISCSI target may match the LBA in the SCSI command with an LBA in the LBA map and identify the corresponding file name. The ISCSI may then use the backup metadata to identify the offset associated with the file corresponding to the file name in the backup stored in the backup storage. The ISCSI target may then use the offset and a connection (e.g., network connection) to the backup storage to read the file data corresponding to the file from the backup storage and return the file data ISCSI initiator to service the SCSI command. The file may be obtained from the backup storage using the backup metadata via other and/or additional methods without departing from embodiments disclosed herein.

In Step 224, the file is provided to the application. In one or more embodiments, the ISCSI initiator provides the file data of the file to the application. The ISCSI initiator may populate the placeholder file in the virtual hard disk file with the file data obtained from the backup storage where the application may read the file data. The file may be provided to the application via other and/or additional methods without departing from embodiments disclosed herein.

In one or more embodiments disclosed herein, the method ends following Step 224.

Figure 3:
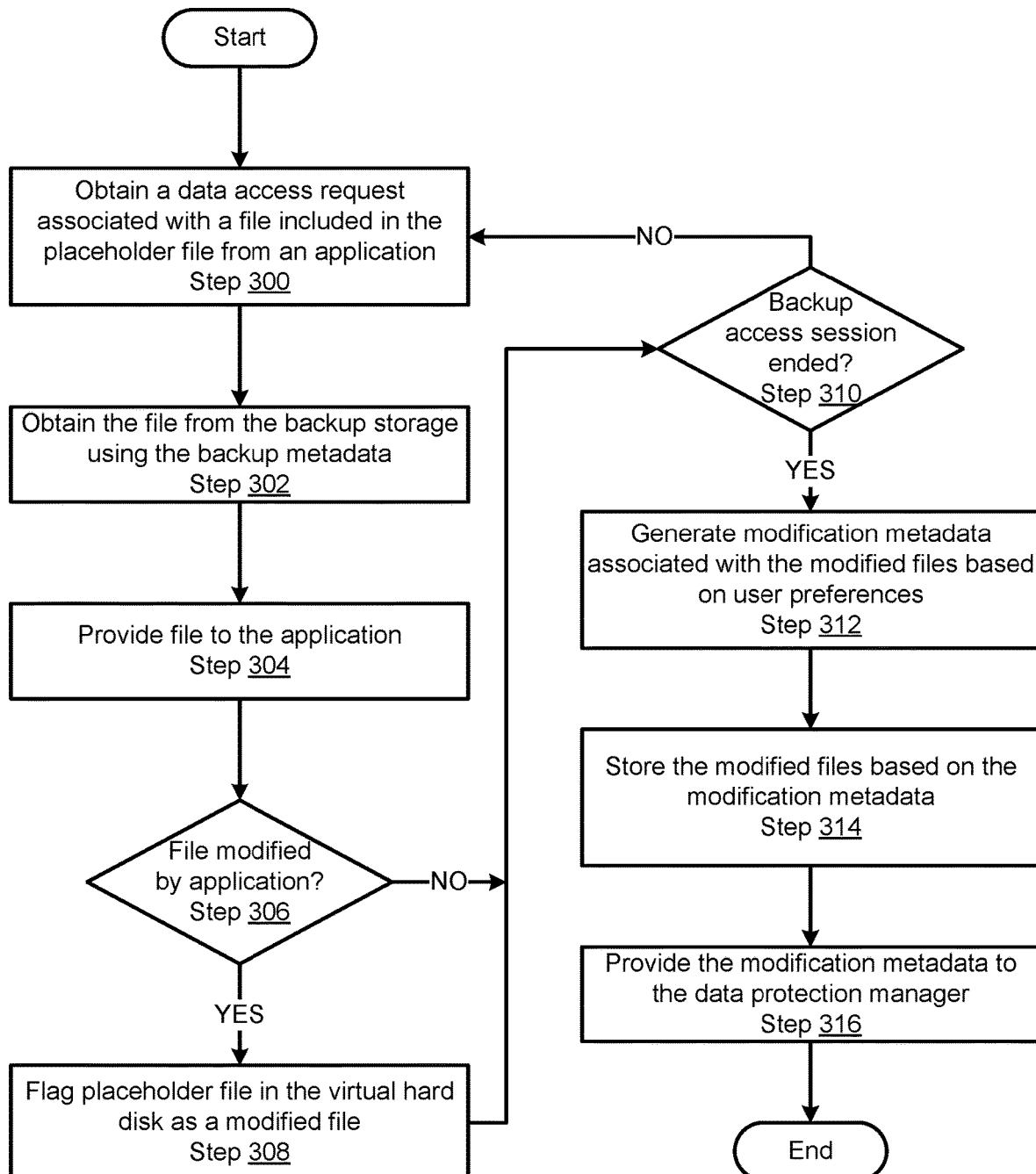
FIG. 3 shows a flowchart of a method for preserving data generated during item level backup access in accordance with one or more embodiments disclosed herein.

FIG. 3 shows a flowchart of a method for preserving data generated during item level backup access in accordance with one or more embodiments disclosed herein. The method shown in FIG. 3 may be performed by, for example, a data protection agent (e.g., 104, FIG. 1B). Other components of the system in FIGS. 1A-1C may perform all, or a portion, of the method of FIG. 3 without departing from the scope of the embodiments described herein. While FIG. 3 is illustrated as a series of steps, any of the steps may be omitted, performed in a different order, additional steps may be included, and/or any or all of the steps may be performed in a parallel and/or partially overlapping manner without departing from the scope of the embodiments described herein.

Prior to Step 300, a backup has been generated and stored in the backup storage via the method discussed above in FIG. 2A. Additionally, item level access of the backup has been set up via the method discussed above in FIG. 2B.

Initially, in Step 300, a data access request associated with a placeholder file in the placeholder file system stored in the virtual hard disk file is obtained from an application. In one or more embodiments, the application submits a read request to the data protection agent. The data protection agent may then, through the ISCSI initiator, submit a SCSI command to read a placeholder file in the place holder file system stored in the virtual hard disk file ISCSI target. The read request and the resulting SCSI command may include the LBA and the file size associated with the file. The data access request associated with the file may be the ISCSI command. A data access request associated with a file in the placeholder file system stored on the virtual hard disk file may be obtained from the application via other and/or additional methods without departing from embodiments disclosed herein.

In Step 302, the file is obtained from the backup storage using the backup metadata. In one or more embodiments, the ISCSI target may not be able to directly obtain the file data using the LBA since the LBA is associated with the virtual hard disk file and not the backup stored in the backup storage. Accordingly, the ISCSI target uses the LBA map included in the backup metadata to identify the file corresponding to the placeholder file is associated with the SCSI command. As discussed above, the LBA map may include a key value map that specifies LBAs and the corresponding file names or file identifiers. The ISCSI target may match the LBA in the SCSI command with an LBA in the LBA map and identify the corresponding file name. The ISCSI may then use the backup metadata to identify the offset associated with the file corresponding to the file name in the backup stored in the backup storage. The ISCSI target may then use the offset and a connection (e.g., network connection) to the backup storage to read the file data corresponding to the file from the backup storage and return the file data ISCSI initiator to service the SCSI command. The file may be obtained from the backup storage using the backup metadata via other and/or additional methods without departing from embodiments disclosed herein.

In Step 304, the file is provided to the application. In one or more embodiments, the ISCSI initiator provides the file data of the file to the application. The ISCSI initiator may populate the placeholder file in the virtual hard disk file with the file data obtained from the backup storage where the application may read the file data. The file may be provided to the application via other and/or additional methods without departing from embodiments disclosed herein.

In Step 306, a determination is made as to whether the file is modified by the application. In one or more embodiments, the application may perform additional operations on the file data in the placeholder file system on the virtual hard disk file. The operations may include deleting a file, modifying a file (e.g., writing additional data to the file, modifying data in the file, or deleting part of the data in the file), adding a file, moving a file, etc. Because the virtual hard disk file is loaded on the ISCSI target, the ISCSI target may have knowledge of the operations performed by the application on the file data in the virtual hard disk file. The ISCSI target may notify the data protection agent when an operation, other than a read operation, is performed such that the file data in the placeholder file system on the virtual hard disk file is modified. In one or more embodiments, if the ISCSI target notifies the data protection agent about a modification to file data in the virtual hard disk file, then the data protection agent may determine that the file is modified by the application agent. In one or more embodiments, if the ISCSI target does not notify the data protection agent about a modification to file data in the virtual hard disk file, then the data protection agent may determine that the file is not modified by the application agent. The determination as to whether the file is modified by the application may be made via other and/or additional methods without departing from embodiments disclosed herein.

In one or more embodiments disclosed herein, if it is determined that the file is modified by the application, then the method proceeds to Step 308. In one or more embodiments disclosed herein, if it is determined that the file is not modified by the application, then the method proceeds to Step 310.

In Step 308, the placeholder file in the virtual hard disk file is flagged as a modified file. In one or more embodiments, the data protection agent may request the ISCSI target to flag the placeholder file, now with modified file data, as a modified file. The ISCSI target may set a modification flag within the placeholder file, or tag the placeholder file with a modification tag in the virtual hard disk file. The ISCSI target may also include the type of modification(s) performed on the file data in the virtual hard disk file (e.g., changing data, adding data, deleting data, deleting the file, etc.) in the placeholder file. The placeholder file in the virtual hard disk file may be flagged as a modified file via other and/or additional methods without departing from embodiments disclosed herein.

In Step 310, a determination is made as to whether the backup access session has ended. In one or more embodiments, the application submits a request to terminate the backup access session to the data protection agent. The data protection agent may then, through the ISCSI initiator, submit a SCSI command to end the backup access session using the virtual hard disk file to the ISCSI target. The data protection agent may wait for the request to terminate the backup access session. In one or more embodiments, if the data protection agent obtains a request to terminate the backup access session from the application, then the data protection agent may determine that the backup access session has ended. In one or more embodiments, if the data protection agent has not obtained a request to terminate the backup access session from the application, then the data protection agent may determine that the backup access session has not ended. The determination as to whether the backup access session has ended may be made via other and/or additional methods without departing from embodiments disclosed herein.

In one or more embodiments disclosed herein, if it is determined that the backup access request has ended, then the method proceeds to Step 312. In one or more embodiments disclosed herein, if it is determined that the backup access request has not ended, then the method proceeds to Step 300. In one or more embodiments, Steps 300-304 may be performed multiple times to provide file data associated with multiple files to the application. Steps 306 and 308 may be performed for all placeholder files that include file data during a backup access session to identify and flag modified files during a backup access session. In one or more embodiments, a backup access session may refer to the continuous performance of backup access services.

In Step 312, modification metadata associated with the modified files is generated based on user preferences. After the backup session has ended, the ISCSI target may mount or otherwise provide the updated virtual hard disk file to the data protection agent. The updated virtual hard disk file may include one or more placeholder files with modified file data that have been tagged as modified files. In one or more embodiments, the data protection agent generates modification data associated with the modified files based on user preferences.

In one or more embodiments, user preferences may refer to one or more data structures that specify rules for preserving file data generated and/or modified during a backup access session. The rules may specify one, or any combination of, types of operations which are to be preserved, specific file types to be preserved, specific files to preserve, and one or more storage locations to store the modified file data associated with modified files in the virtual hard disk file. The user preferences may also specify which storage locations store which modified files. The user preferences may include other and/or additional rules associated with preserving data generated during a backup access session without departing from embodiments disclosed herein. The user preferences may be generated by user of the system and may be obtained by the data protection agent from the data protection manager.

As an example, the user preferences may specify a rule that only modified files associated with modification operations may be preserved. Accordingly, the data protection agent may generate modification metadata associated with file data of placeholder files in the virtual hard disk file that have been modified. The data protection agent may then ignore deleted placeholder file data associated with delete operations and new file data associated with placeholder file adding operations.

As another example, the user preferences may specify that only modified file data of particular files associated with particular file names are to be preserved, regardless of the type of modification operation that occurred on the files. Accordingly, the modified file data associated with all other files may be ignored by the data protection agent during modification metadata generation.

As discussed above, the data protection agent may generate a modification metadata file that may include file identifiers associated files that had their file data modified during the backup access session, modification types (e.g., modified, added, deleted, etc.), corresponding backup identifiers associated with the backup access session, storage locations, and updated file sizes associated with files that have been modified during backup access services. The modification metadata associated with the modified files may be generated based on user preferences via other and/or additional methods without departing from embodiments disclosed herein.

In Step 314, the modified files are stored based on the modification metadata. As discussed above, the modification metadata may specify one or more storage locations to store the modified file data in the virtual hard disk file generated during the backup access session as specified by the user preferences. The storage locations may include the backup storage, the host (e.g., the file system data repository), or another external or remote storage not illustrated in the systems of FIGS. 1A-1C. The modified files and their corresponding file data may be sent to the one or more storage locations via any appropriate method of data transmission without departing from embodiments disclosed herein. Each modified file and its corresponding data may be stored in each of the specified storage locations, or portions of the modified files may be stored in one specified storage location and other portions of the modified files may be stored in another specified storage locations according to the modification metadata. The modified files may be stored based on the modification metadata via other and/or additional methods without departing from embodiments disclosed herein.

In Step 316, the modification metadata is provided to the data protection manager. In one or more embodiments, the data protection agent sends the modification metadata to the data protection manager along with a request to store the modification metadata. In response to obtaining the modification metadata and the request, the data protection manager stores the modification metadata in the backup metadata repository. The modification metadata and the request may be provided to the data protection manager using any appropriate method of data transmission without departing from embodiments disclosed herein. For example, the data protection agent may transmit the modification metadata and the request as a message that includes one or more network packets through one or more network devices that operatively connect the data protection agent to the data protection manager. The modification metadata may be provided to the data protection manager via other and/or additional methods without departing from embodiments disclosed herein. The data protection manager may use the modification metadata to stitch the modified files to an existing backup to restore the file system or an application of the host to a point in time. As a result, data generated during a backup access session may be preserved and protected preventing critical data loss.

In one or more embodiments disclosed herein, the method ends following Step 316.

Figure 4:
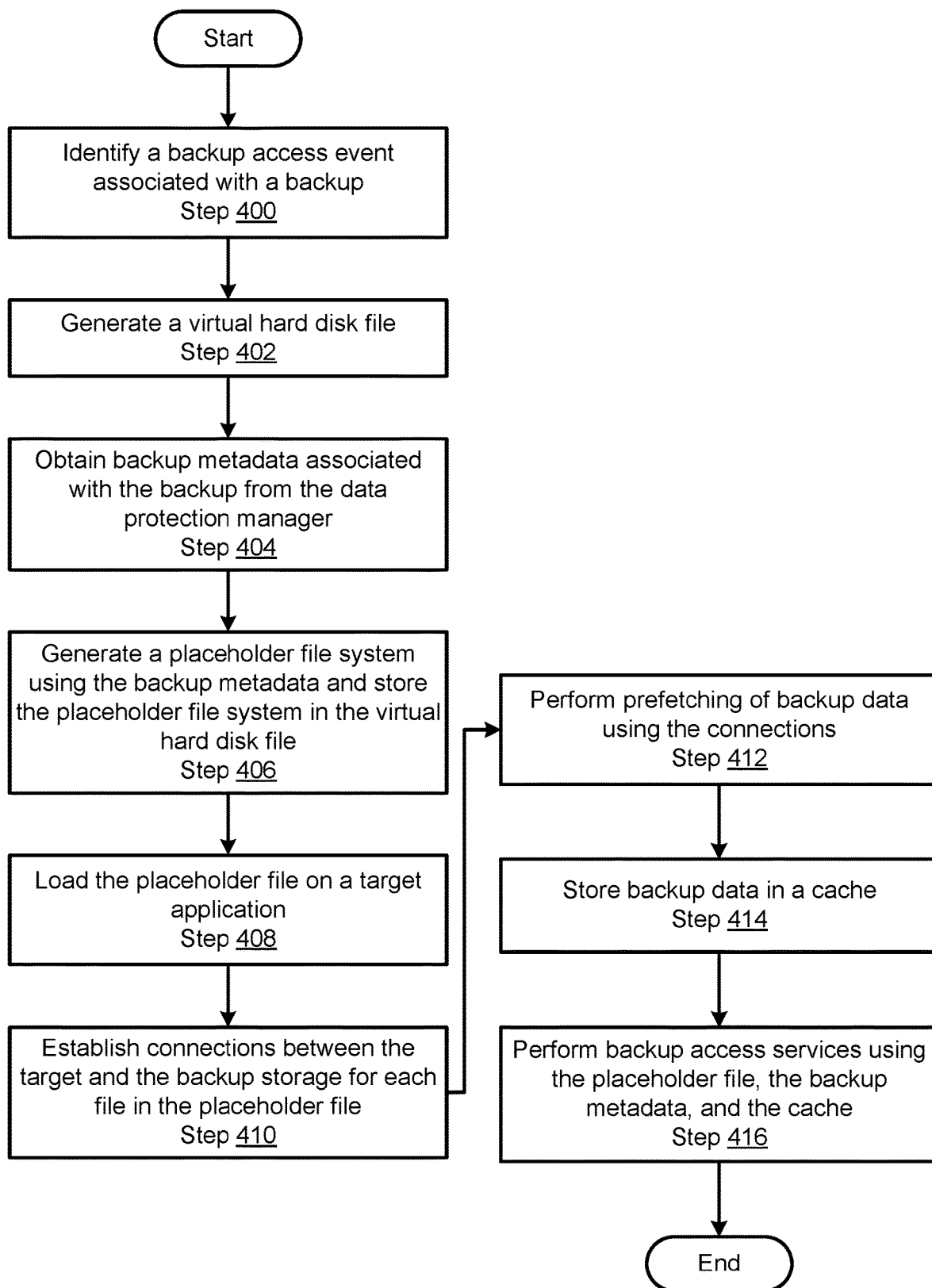
FIG. 4 shows a flowchart of a method for performing prefetching during item level access of a backup in accordance with one or more embodiments disclosed herein.

FIG. 4 shows a flowchart of a method for performing prefetching during item level access of a backup in accordance with one or more embodiments disclosed herein. The method shown in FIG. 4 may be performed by, for example, a data protection agent (e.g., 104, FIG. 1B). Other components of the system in FIGS. 1A-1C may perform all, or a portion, of the method of FIG. 4 without departing from the scope of the embodiments described herein. While FIG. 4 is illustrated as a series of steps, any of the steps may be omitted, performed in a different order, additional steps may be included, and/or any or all of the steps may be performed in a parallel and/or partially overlapping manner without departing from the scope of the embodiments described herein.

Prior to Step 400, a backup is generated using the methods discussed above in FIG. 2A.

Initially, in Step 400, a backup access event associated with a backup is identified. In one or more embodiments, the data protection agent may obtain a request to access a backup. The request may be from an application, directly from a user of the application, or from the data protection manager in response to a through a request obtained from a user through a user interface. The data protection agent may identify the receipt of the request as the backup access event. The request may include an application specific backup access request (i.e., a request to access a backup of files of the host file system associated with a particular application). In another embodiment, the request may include a file system backup access request (i.e., a request to access a backup of the entire file system of the host). The request may include the backup identifier associated with the backup targeted by the request. The request may include other and/or additional information associated with the backup without departing from embodiments disclosed herein. The backup generation event associated with a backup may be identified via other and/or additional methods without departing from embodiments disclosed herein.

In Step 402, a virtual hard disk file is generated. In one or more embodiments, the data protection agent generates a virtual hard disk file. The virtual hard disk file may be, for example, a virtual hard disk v2 (VHDX) file consistent with VHDX format. The virtual hard disk file may not include any data and/or metadata upon generation. The data protection agent may also mount the virtual hard disk file to the host. The virtual hard disk file may be generated via other and/or additional methods without departing from embodiments disclosed herein.

In Step 404, backup metadata associated with the backup is obtained from the data protection manager. In one or more embodiments, the data protection agent sends a request for the backup metadata associated with the backup to the data protection manager. The request may include the backup identifier. In response to obtaining the request, the data protection manager obtains and sends the backup metadata to the data protection agent. The backup metadata and the request may be provided to and from the data protection agent using any appropriate method of data transmission without departing from embodiments disclosed herein. For example, the data protection agent may transmit the request as a message that includes one or more network packets through one or more network devices that operatively connect the data protection agent to the data protection manager. Additionally, the data protection manager may transmit the backup metadata as a message that includes one or more network packets through one or more network devices that operatively connect the data protection agent and the data protection manager. The backup metadata associated with the backup may be obtained from the data protection manager via other and/or additional methods without departing from embodiments disclosed herein.

In Step 406, a placeholder file system is generated based on the backup metadata and stored in the virtual hard disk file. In one or more embodiments, the data protection agent may generate a placeholder file system using the backup metadata and store the placeholder file system in the virtual hard disk file. The placeholder file system may include placeholder files arranged in the hierarchy specified in the backup metadata (e.g., via the parent file identifiers). The placeholder files may include the file identifiers associated with the corresponding file as specified by the backup metadata. The placeholder files may be set to include the length of the corresponding file as specified by the backup metadata. The placeholder files may include other information (e.g., file type, creation timestamps, corresponding application identifier, etc.) associated with the corresponding files in the backup without departing from embodiments disclosed herein. The placeholder files of the placeholder file system in the virtual hard disk file may not yet include actual file data.

In one or more embodiments, the data protection agent may obtain logical block addresses (LBAs) associated with each placeholder file in the placeholder file system stored in the virtual hard disk file. An LBA may refer to a block or other portion of virtual hard disk file where a placeholder file of the placeholder file system is stored or located. The data protection agent may generate a map of the LBAs and the corresponding placeholder files. The map may be any type of mapping without departing from embodiments disclosed herein. For example, the map may be a key value map where the LBA of a file is the key and the file name is the corresponding value. The LBA map may be included in the virtual hard disk file. The backup metadata may be updated to include a copy of the LBA map. The placeholder file system may be generated using the backup metadata and stored in the virtual hard disk file via other and/or additional methods without departing from embodiments disclosed herein.

In Step 408, the virtual hard disk file is loaded onto the target application. In one or more embodiments, the data protection agent unmounts the virtual hard disk file. The data protection agent may launch, instantiate, initiate launch or otherwise initiate instantiation of an ISCSI target. The ISCSI target may be a software-based ISCSI target (e.g., computing instructions executed on the host, data protection agent, or the backup storage) or a hardware-based ISCSI target (e.g., a physical device including circuitry or a computing device such as a server) configured to receive and service ISCSI commands. The ISCSI target may be operatively connected to the backup storage and the data protection agent. The ISCSI target may open or otherwise access the virtual hard disk file, and generate an asset hierarchy using the identified subscriptions and the corresponding account information. The data protection agent may then launch or instantiate an ISCSI initiator. The ISCSI initiator may be a software-based ISCSI initiator (e.g., computing instructions executed on the host or the data protection agent) or a hardware-based ISCSI initiator (e.g., a physical device including circuitry or a computing device such as a server) configured to generate and send ISCSI commands. The ISCSI initiator may be operatively connected to the application. The data protection agent then establishes a connection between the ISCSI initiator and the ISCSI target such that the ISCSI initiator may send ISCSI commands to the ISCSI target, which may then service the commands and return the results to the ISCSI initiator.

The ISCSI target may load the virtual hard disk file and supply logical unit number (LUN) information to the ISCSI initiator. The LUN information may enable the initiator to present the virtual hard disk file as a volume to the target application executing on the host. The virtual hard disk file may be loaded on the target application via other and/or additional methods without departing from embodiments disclosed herein.

In Step 410, connections between the target application and the backup storage are established for each file included in the placeholder file system. In one or more embodiments, the ISCSI target establishes a connection (e.g., a network connection) with the backup storage for each file included in the placeholder file system on the virtual hard disk file using any appropriate method, technique, or framework for establishing a network connection without departing from embodiments disclosed herein. Each connection may be used to read file data associated with a single file from the backup storage system that corresponds to the placeholder file stored on the virtual hard disk drive. Connections between the target application and the backup storage may be established for each file included in the placeholder file system stored on the virtual hard disk file via other and/or additional methods without departing from embodiments disclosed herein.

In Step 412, prefetching of the backup data is performed using the connections. In one or more embodiments, the ISCSI target performs prefetching of the file data associated with each file included in the placeholder file by reading the file data from the backup storage through the established connections. In one or more embodiments, the ISCSI target may read the file data associated with each file from the backup storage sequentially based on the hierarchy of the files included in the placeholder file system on the virtual hard disk file and in the backup stored on the backup storage. The backup data may refer to the obtained file data read from the backup storage. Prefetching of the backup data may be performed using the connections via other and/or additional methods without departing from embodiments disclosed herein.

In Step 414, the backup data is stored in a cache. In one or more embodiments, as the backup data is read from the backup storage, the ISCSI target may store the backup data in a cache. The cache may be a cache on the ISCSI target or the host. The ISCSI target may continue to store backup data from the backup storage in the cache until all backup data is read. The backup data may be stored in a cache via other and/or additional methods without departing from embodiments disclosed herein.

In Step 416, backup access services are performed using the virtual hard disk file, the backup metadata, and the cache. As a result, the backup data may be pulled from the cache instead of read from the backup storage, greatly improving the speed in satisfying data access requests during backup access sessions and reducing command timeouts.

In one or more embodiments, the application submits a read request to the data protection agent. The data protection agent may then, through the ISCSI initiator, submit a SCSI command to read a placeholder file in the place holder file system stored in the virtual hard disk file ISCSI target. The read request and the resulting SCSI command may include the LBA and the file size associated with the file. The data access request associated with the file may be the ISCSI command. A data access request associated with a file in the placeholder file system stored on the virtual hard disk file may be obtained from the application via other and/or additional methods without departing from embodiments disclosed herein.

In one or more embodiments, the ISCSI target may not be able to directly obtain the file data using the LBA since the LBA is associated with the virtual hard disk file and not the backup stored in the cache. Accordingly, the ISCSI target uses the LBA map included in the backup metadata to identify the file corresponding to the placeholder file is associated with the SCSI command. As discussed above, the LBA map may include a key value map that specifies LBAs and the corresponding file names or file identifiers. The ISCSI target may match the LBA in the SCSI command with an LBA in the LBA map and identify the corresponding file name. The ISCSI may then use the backup metadata to identify the offset associated with the file corresponding to the file name in the backup stored in the cache. The ISCSI target may then use the offset to read the file data corresponding to the file from the cache and return the file data ISCSI initiator to service the SCSI command. The file may be obtained from the cache using the backup metadata via other and/or additional methods without departing from embodiments disclosed herein.

In one or more embodiments disclosed herein, the method ends following Step 416.

Figure 5:
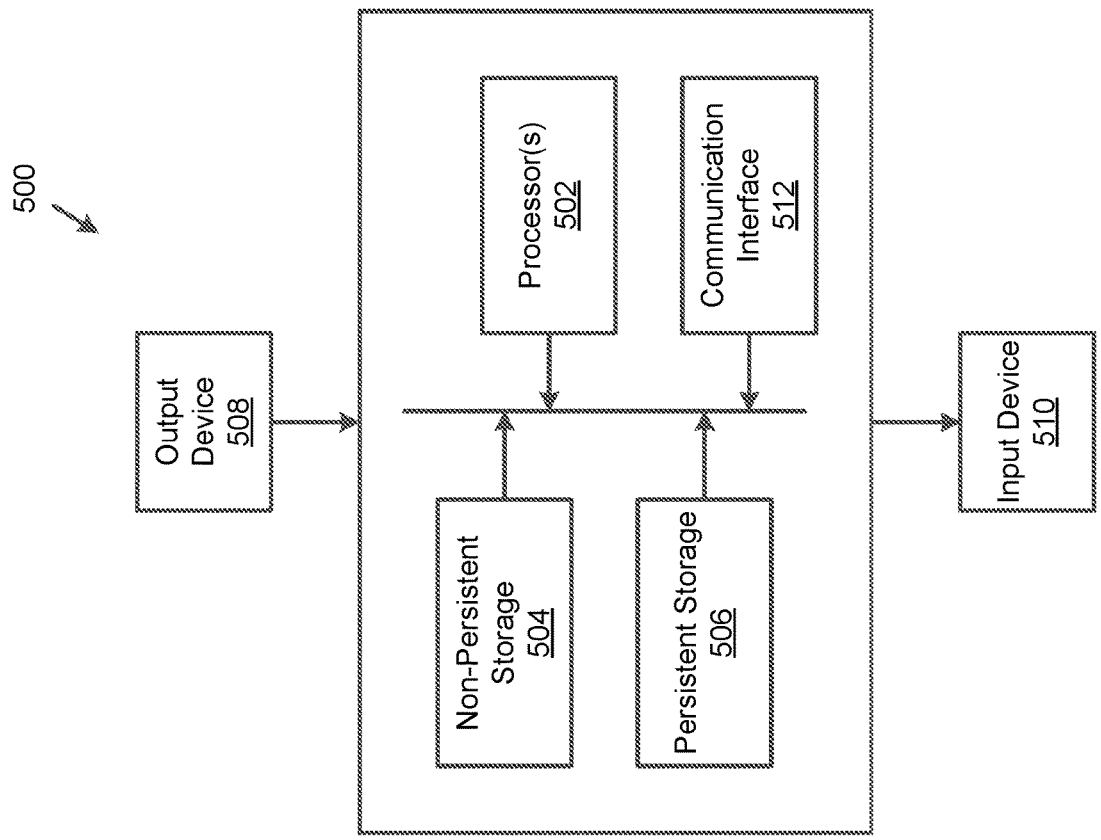
FIG. 5 shows a diagram of a computing device in accordance with one or more embodiments disclosed herein.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing data protection of file system data on a host, comprising:
   identifying, by a data protection agent, a backup access event associated with a backup of a file system stored on a backup storage;
   in response to identifying the backup access event:
      obtaining backup metadata associated with the backup from a data protection manager;
      generating a placeholder file system using the backup metadata and storing the placeholder file system in virtual hard disk file, wherein the placeholder file system is stored in the virtual hard disk file in a hierarchy of placeholder files that specifies file identifiers and file sizes of the placeholder files included in the placeholder file system;
      loading the virtual hard disk file on a target application;
      performing, after the loading, prefetching of backup data using the virtual hard disk file and the backup metadata to store the backup data in a cache; and
      performing backup access services using the virtual hard disk file, the backup metadata, and the cache.

2. The method of claim 1, wherein prefetching of backup data comprises:
   establishing connections between the placeholder files in the placeholder file system and the backup storage;
   fetching the backup data associated with the placeholder files using the connections; and
   storing the backup data in the cache.

3. The method of claim 2, wherein each placeholder file of the placeholder file system stored in the virtual hard disk file is associated with a separate connection to the backup storage.

4. The method of claim 3, the backup data associated with each file is fetched sequentially.

5. The method of claim 1, wherein prior to prefetching of backup data, the placeholder file system does not comprise file system data.

6. The method of claim 1, wherein, for each file corresponding to the placeholder files in the placeholder file system, the backup metadata comprises:
   a file identifier associated with the file;
   a file size associated with the file;
   an application identifier associated with the file;
   a parent file identifier associated with the file; and
   storage location information associated with the file.

7. The method of claim 6, wherein the backup metadata further comprises an application identifier and application type associated with the application.

8. A non-transitory computer readable medium comprising computer readable program code, which when executed by a computer processor enables the computer processor to perform a method for performing data protection of file system data on a host, the method comprising:
   identifying, by a data protection agent, a backup access event associated with a backup of a file system stored on a backup storage;
   in response to identifying the backup access event:
      obtaining backup metadata associated with the backup from a data protection manager;
      generating a placeholder file system using the backup metadata and storing the placeholder file system in virtual hard disk file, wherein the placeholder file system is stored in the virtual hard disk file in a hierarchy of placeholder files that specifies file identifiers and file sizes of the placeholder files included in the placeholder file system;
      loading the virtual hard disk file on a target application;
      performing, after the loading, prefetching of backup data using the virtual hard disk file and the backup metadata to store the backup data in a cache; and
      performing backup access services using the virtual hard disk file, the backup metadata, and the cache.

9. The non-transitory computer readable medium of claim 8, wherein the virtual hard disk file comprises a VHDX file.

10. The non-transitory computer readable medium of claim 8, wherein prefetching of backup data comprises:
  establishing connections between the placeholder files in the placeholder file system and the backup storage;
  fetching the backup data associated with the placeholder files using the connections; and
  storing the backup data in the cache.

11. The non-transitory computer readable medium of claim 10, wherein each placeholder file of the placeholder file system stored in the virtual hard disk file is associated with a separate connection to the backup storage.

12. The non-transitory computer readable medium of claim 11, the backup data associated with each placeholder file is fetched sequentially.

13. The non-transitory computer readable medium of claim 8, wherein prior to performing the backup access services using the placeholder file and the backup metadata, the placeholder file does not comprise file system data.

14. The non-transitory computer readable medium of claim 8, wherein, for each file corresponding to the placeholder files in the placeholder file system, the backup metadata comprises:
  a file identifier associated with the file;
  a file size associated with the file;
  an application identifier associated with the file;
  a parent file identifier associated with the file; and
  storage location information associated with the file.

15. The non-transitory computer readable medium of claim 14, wherein the backup metadata further comprises an application identifier and application type associated with the application.

16. A system for performing data protection of file system data on a host, comprising:
  a backup storage for storing backups; and
  a host comprising a data protection agent programmed to:
    identify, by a data protection agent, a backup access event associated with a backup of a file system stored on a backup storage;
    in response to identifying the backup access event:
      obtain backup metadata associated with the backup from a data protection manager;
      generate a placeholder file system using the backup metadata and storing the placeholder file system in virtual hard disk file, wherein the placeholder file system is stored in the virtual hard disk file in a hierarchy of placeholder files that specifies file identifiers and file sizes of the placeholder files included in the placeholder file system;
    load the virtual hard disk file on a target application;
    perform, after the loading, prefetching of backup data using the virtual hard disk file and the backup metadata to store the backup data in a cache; and
    perform backup access services using the virtual hard disk file, the backup metadata, and the cache.

17. The system of claim 16, wherein prefetching of backup data comprises:
  establishing connections between the placeholder files in the placeholder file system and the backup storage;
  fetching the backup data associated with the placeholder files using the connections; and
  storing the backup data in the cache.

18. The system of claim 17, wherein each placeholder file of the placeholder file system stored in the virtual hard disk file is associated with a separate connection to the backup storage.

* * * * *